(12) United States Patent
Inohara et al.

(10) Patent No.: US 6,182,111 B1
(45) Date of Patent: Jan. 30, 2001

(54) METHOD AND SYSTEM FOR MANAGING DISTRIBUTED DATA

(75) Inventors: Shigekazu Inohara, Kokubunji; Toyohiko Kagimasa, Yokohama; Yoshimasa Masuoka, Kodaira; Fumio Noda, Kodaira; Jinghua Min, Kodaira, all of (JP)

(73) Assignee: Hitachi, Ltd., Tokyo (JP)

( * ) Notice: Under 35 U.S.C. 154(b), the term of this patent shall be extended for 0 days.

(21) Appl. No.: 09/079,151

(22) Filed: May 15, 1998

(30) Foreign Application Priority Data

May 15, 1997 (JP) .................................................. 9-125247

(51) Int. Cl.[7] ...................................................... G06F 15/16
(52) U.S. Cl. ........................... 709/201; 709/202; 709/203; 709/217; 709/219; 709/223; 707/10
(58) Field of Search ..................................... 709/225, 226, 709/233, 235, 238, 239, 241, 244, 200–204, 216–220, 223–224, 227–228; 707/1, 9–10, 100, 104

(56) References Cited

U.S. PATENT DOCUMENTS

| | | | |
|---|---|---|---|
| 5,548,724 | * 8/1996 | Akizawa et al. | 709/203 |
| 5,712,981 | * 1/1998 | McKee et al. | 709/241 |
| 5,764,908 | * 6/1998 | Shoji et al. | 709/217 |
| 5,774,660 | * 6/1998 | Brendel et al. | 709/201 |
| 5,864,670 | * 6/1999 | Hayashi et al. | 709/204 |
| 5,913,041 | * 6/1998 | Ramanathan et al. | 709/233 |
| 5,915,095 | * 6/1998 | Miskowie | 709/223 |
| 6,085,239 | * 7/2000 | Kubo et al. | 709/223 |

OTHER PUBLICATIONS

Sape Mullender etc. "Distributed Systems (1st ed.)", pp. 13–15, ACM press, 1989.

A. Chankhunthod etc, "A Hierarchical Internet Object Cache", 1996 USENIX Technical Conference, pp. 153–163, 1996.

B. Kantor etc. "Network News Transfer Protocol: A Proposed Standard for the Stream–Based Transmission of News" Network Working Group RFC–977, Feb. 1986.

P. Mockapetris "Domain Names–Implementation and Specification" Network Working Group RFC–1035, Nov. 1987.

Michael Dahlin etc. "Cooperative Caching: Using Remote Client Memory to Improve File System Performance", First USENIX Symposium on Operating Systems Design and Implementation, 1994.

M. J. Feeley etc."Implementing Global Memory Management in an Workstation Cluster", ACM 15th Symposium on Operating Systems Principles,pp. 201–212, 1995.

P.Sarkar etc. "Efficient Cooperative Caching Using Hints", Second USENIX Symposium on Operating Systems Design and Implementation,pp. 35–46, 1996.

Jeffrey Kuskin etc."The Stanford FLASH Multiprocessor", Proceedings of the 21st Annual International Symposium on Computer Architecture,pp. 302–314,ACM, 1994.

Henk L. Muller etc."The Data Diffusion Machine with a Scalable Point–to–Point Network", Technical Report CSTR–93–17, Department of Computer Science, University of Bristol, Oct. 1993.

* cited by examiner

Primary Examiner—Robert B. Harrell
Assistant Examiner—Bharat Barot
(74) Attorney, Agent, or Firm—Antonelli, Terry, Stout & Kraus, LLP

(57) ABSTRACT

Irregular and unstable natures of the Internet to be caused by an increase in Internet accessing users are alleviated and services of an information system more comfortable to users are provided. To this end, each servers among a plurality of servers cooperating to provide services stores the past communications line state (throughput and latency), and in accordance with the stored communications lines state, cache reference and prefetch are preformed between optional servers.

29 Claims, 8 Drawing Sheets

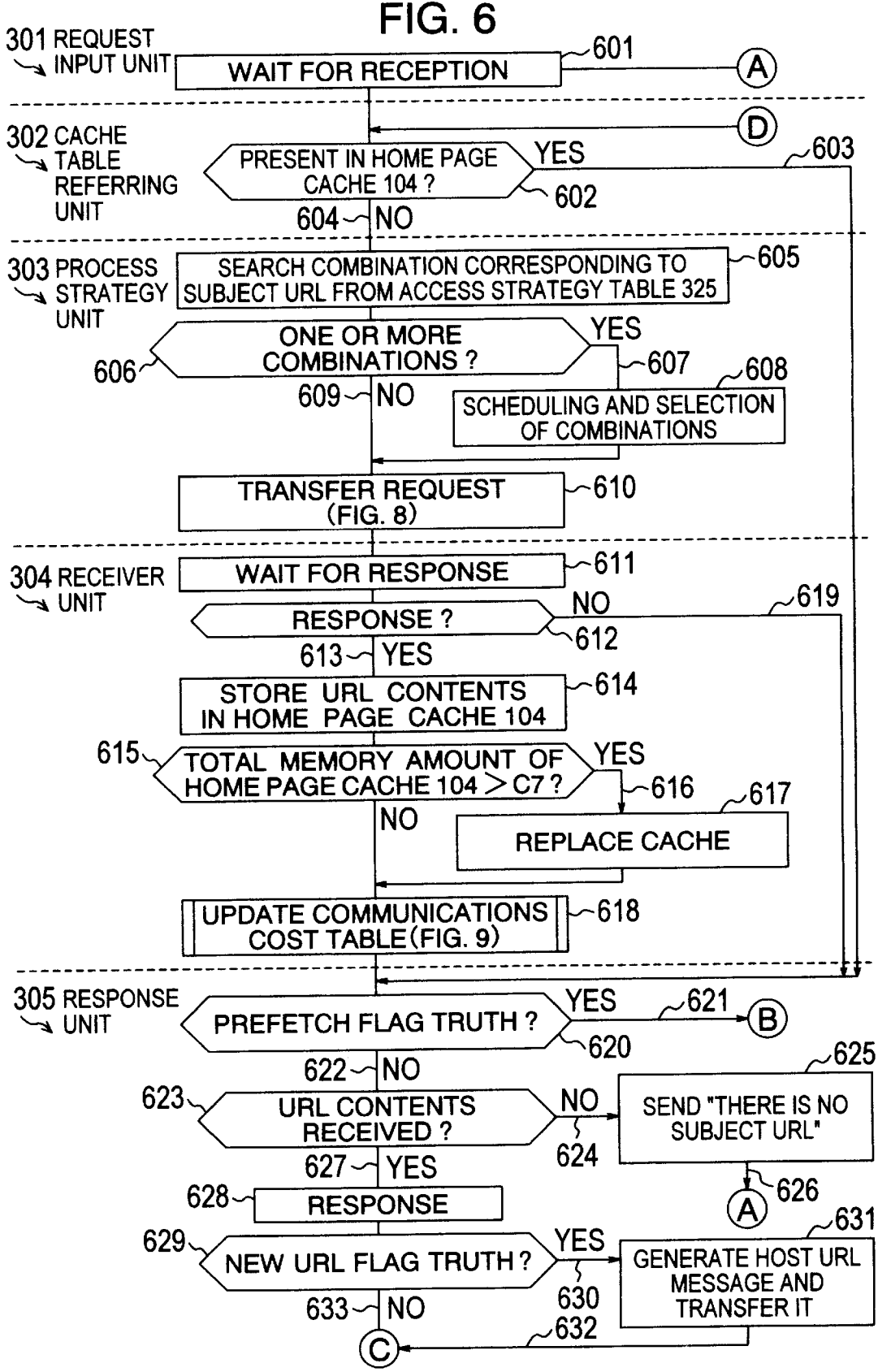

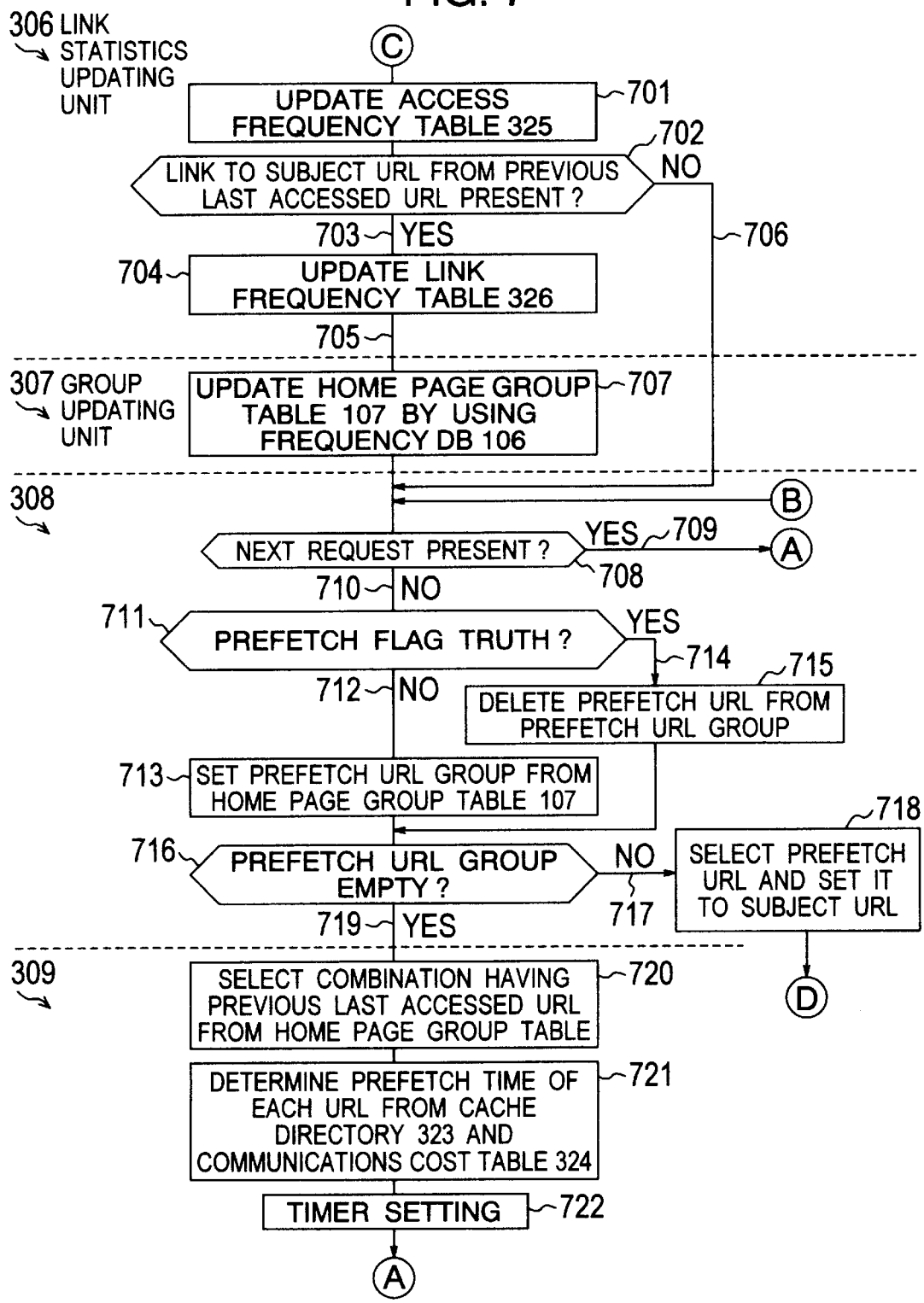

METHOD AND SYSTEM FOR MANAGING DISTRIBUTED DATA

BACKGROUND OF THE INVENTION

The present invention relates to a computer system, and more particularly to a method and system for managing distributed data, suitable particularly for the world wide web (WWW), in which a plurality of computers interconnected by a network distribute, share and exchange data in an information system.

First, several terms used in the following description will be explained.

An information system such as WWW and anonymous FTP on the Internet is configured as a "client-server system" which is one type of distributed computer systems. In the client-server system, the processes in the whole system are classified into two parts. The first part is executed by a program (hereinafter called a process) called a "server", and the second part is executed by processes called "clients". A client in the information system generally runs on a computer operated by a home user or a company user. The server in the information system stores information to be supplied to clients. The client in the information system stores new information in the server or requests information from the server.

It is common in a computer system that the same information is temporarily copied to a plurality of sites in order to access the information at high speed or increase a possibility of accessibility. Such a copy is discriminably called hint, cache, replica, stash and the like (refer to a document "Distributed Systems (1st ed.) compiled by Sape Mullender, pp. 13–15, ACM press, 1989). In the following, these copies are collectively called a "cache". To make a cache is called "cache".

A WWW server in WWW stores information to be serviced, in a unit called a "home page". Each home page has a name called URL (abbreviation for uniform resource locator). URL is a character string capable of designating a protocol used in WWW, a host name of a computer as an information source, and specific data in the information source. For example, "http://www.hitachi.co.jp/index.html" is a URL.

Generally, each URL is in correspondence with a collection of data including character and image data of a home page. In the following, a collection of such data is called "URL corresponding information" or "URL contents". A second URL contained in the first URL corresponding information is called a "hyper text link (or simply link)". That the first URL corresponding information contains a second URL is hereinafter described as "there is a link from the first URL to the second URL".

The techniques (hereinafter called prior example 1) used by WWW will be explained in the following.

A user of a WWW client supplies a URL of the home page to be accessed, to the WWW server. In the first process type between a WWW server and client, the WWW client requests the WWW server designated by the second element of URL to transmit the home page of URL. In response to this request, the WWW server supplies the home page to the WWW client.

In the second process type, instead of requesting the WWW server designated by the second element of URL supplied from the user, the WWW client requests a second server called a "proxy server" to transmit the home page. The second server acquires the home page of URL from the first WWW server or requests another proxy server to acquire the URL corresponding information. At the repetitive stage of proxy server requests, these proxy servers have parent-child relationships. Proxy servers having a parent-child relationship are described, for example, in a document "A Hierarchical Internet Object Cache" by A. Chankhunthod, et.al., 1996 USENIX Technical Conference, pp. 153–163, 1996.

A WWW client and proxy server can have caches. A cache of a client stores home pages the client acquired in the past, and can be used only by this client. A cache of a proxy server stores home pages acquired by the proxy server in response to a request from one or more clients, a request from another or more other servers, or a request from both, and can be shared by the clients using this proxy server or by this proxy server itself.

The Network News System (hereinafter called prior example 2) is described, for example, in a document "Network News Transfer Protocol: A proposed Standard for the Stream-Based Transmission of News" by B. Kantor, et.al., Network Working Group RFC-977. This system is configured by one or more servers. Generally, a user selects one of the servers by using its client. The information unit in the Network News System is called "news". Generally, a user supplies news to the server by using its client, and acquires news from the server. As the user supplies news to a first server, the first server sends a copy of the news to a second server, and the second server supplies a copy of the news to another server, and so on. Finally, the copy of the news is supplied to all the servers.

Next, the global area name service, Domain Name System (hereinafter called prior example 3, abbreviated as DNS) will be explained. DNS is described, for example, in a document "Domain Names-Implementation and Specification" by P. Mockapetris, Network Working Group RFC-1035, particularly in the second section thereof. DNS has a correspondence mainly between a symbolic host name and host related information (IP address and mail address). A plurality of DNS servers have a tree structure. A request from a client is processed by tracing the tree structure and transferring the request to a plurality of servers. A resolver which is a DNS client requests the host related information corresponding to a host name to one of the servers. This server returns the host related information corresponding to the host name back to the client, or transfers the request to a parent server of this server (a DNS server nearer to the root of the DSN server tree structure from this server). The parent server grasps which of its child servers have what host related information. Therefore, after the request is transferred to the root of the tree structure, the request is then transferred downward the tree structure to the DNS server capable of processing the request. The request finally reaches the DNS server having the host related information from which the host related information is returned to the client, or alternatively a failure is returned back to the client if every DNS server cannot supply the host related information corresponding to the host name while the request is transferred downward the tree structure.

A method (hereinafter called prior example 4) is also known in which a space of caches is shared by a plurality of computers in a distributed file system of a local area network (LAN). According to a document "Cooperative Caching: Using Remote Client Memory to Improve File System Performance" by Michael Dahlin, et.al., First USENIX Symposium on Operating Systems Design and Implementation, pp. 267–280, 1994, a client first requests for a file block to a server called a "manager". The manager grasps which file block is stored in what computer. The manager informs the client of the computer which stores the file block, or transfers the request of the client to the computer. Similar methods are known as described in a document "Implementing Global Memory Management in an Workstation Cluster" by M. J. Feeley, et.al., ACM 15th Symposium on Operating Systems Principles, pp. 201–212, 1995, or in a document "Efficient Cooperative Caching Using Hints" by P. Sarkar, et.al., Second USENIX Symposium on Operating Systems Design and Implementation, pp. 35–46, 1996. A plurality of managers can be provided. However, a correspondence between file blocks and managers is prefixed and is known by all clients and servers. This correspondence does not change during system running.

Techniques used by computers called cache-coherent non-uniform memory access (CC-NUMA) and cache only memory access (COMA) will be explained by using following prior examples 5 and 6. The CC-NUMA computer or COMA computer has a mechanism of maintaining coherency between memory fragments (cache lines) cached near at a number of processors. The following two methods are known in particular.

With the first method (hereinafter called prior example 5), a processor or data called a "home" corresponding to the "manager" grasps which memory fragment is cached to what processor. This first method is used in a system described, for example, in a document "The Stanford FLASH Multiprocessor" by Jeffrey Kuskin, et.al., Proceedings of the 21th Annual International Symposium on Computer Architecture, pp. 302–314, ACM, 1994.

With the second embodiment (hereinafter called prior example 6), some restrictions are imposed on the formation, deletion and communications of caches, to thereby ensure identification and coherence of caches during a predetermined number of communications (generally including multicast or broadcast). This second method is used in a system described, for example, in a document "The Data Diffusion Machine with a Scalable Point-to-Point Network" by Henk L. Muller, et.al., Technical Report CSTR-93-17, Department of Computer Science, University of Bristol, October 1993.

The current communications performance of the Internet is much more slower than the speed users desire, and has various unstable factors. Because of rocketing spread of the WWW, a number of wide area networks (WAN) are congested. While high speed backbone communications lines are being increased and enhanced day after day, users at homes connect to the Internet via communication lines much slower than a general LAN. The number of users of WWW servers and the Internet is increasing even at present. According to certain statistics as of January 1996, the number of computers connecting the Internet in the world is nine million, and increasing by twofold in less than six months.

These circumstances make Internet communications lines irregular and unstable. "Irregular" means congestions of various communications lines. For example, each communications line has a different throughput (communications data amount per unit time) and a different latency (communications delay time). "Unstable" means that the throughput and latency of a communications line change from time to time and at worst the communications becomes impossible. For example, the congestion degree of a communications line changes with a time zone and a day of the week, or a routing pattern changes because of some enhanced communications line so that another communications line becomes congested or becomes free of congestion.

Under such circumstances, it is required to shorten the time from when a user issues a request to a client to when the request is satisfied, in order for the information system to provide services more comfortable to users. The following issues (1) to (5) regarding such user requirements will be explained.

(1) Under the conditions that some communications line is unstable, a client request may not be processed at high speed even if another communications line operates normally.

A WWW client and a WWW proxy server of the prior example 1 communicate with a specific WWW server and a specific proxy server designated by URLs. Therefore, if the communications line to the server (or proxy server) is congested or interrupted, it takes a long time for the client (or proxy server) to access a home page, or the home page cannot be accessed, even if another communications line operates normally. From the same reasons, even if some communications line is enhanced to have a high speed, it has been difficult to enjoy the high performance of this line. These problems are also true for the prior example 2 to 5, because communications between a client and a server or between a server and another server is performed by prefixed partners, similar to the prior example 1. The prior example 6 pertains to the techniques to be used by a single computer or by a plurality of computers physically in tight contact with each other, in which multicast or broadcast is assumed to be normally operative. Therefore, it is difficult to widely apply these techniques to the LAN and WAN environments. From the same reasons, if a particular communications line is congested or interrupted, it takes a long time to obtain a cache line or the cache line cannot be obtained, even if another communications line operates normally.

(2) A usage factor of caches cannot be improved under the unstable state of communications lines.

In the prior examples 1, 2, 3 and 5, a plurality of caches at a plurality of servers (or clients and servers) have a hierarchical structure. A request issued by a client is processed by a specific first server responsible for this process. This request is either directly transmitted to the first server or sequentially transferred to one or more second servers present between the first server and the client (in this case, one or more second servers are determined definitely in accordance with the contents of the request). In the former case, the request can use the cache of only the first server. In the latter case, the request can use only cache or caches of one or more second servers. Namely, the request cannot use caches of servers other than the first and second servers so that the usage factor of caches is small. For example, in the prior example 1, WWW proxy servers have a parent-child relationship. It is assumed here that there are three proxy servers A, B and C, the server A being a parent and the servers B and C being children of the server A. In this case, although B can use the cache of A by transferring a request to A, B cannot use the cache of C. In the prior example 2, each news is copied to all servers requesting it. Therefore, each child server does not use at all the cache of another child server so that each child server is required to prepare a large scale secondary memory. The prior example 4 assumes the LAN environment in which in order to improve the usage factor of caches, it is controlled to make copies of one data set be as small as in a plurality of caches. However, if a communications line is unstable, a client request may not reach such a small number of caches, resulting in a low cache usage factor. In the prior example 6, of a plurality of caches, a cache which can be acquired in shortest time is selected. For this selection, multicast or broadcast is performed. Therefore, this technique is difficult to be widely applied to the LAN and WAN environments whose communications lines may become unstable.

(3) A method of exchanging among a plurality of servers a use frequency of data reference relationships, has not been applied.

As typical in WWW home pages and hyper text links, data provided by an information system has reference relationships. Of these reference relationships, there is in many cases a reference relationship frequently accessed (reference relationship having a high use frequency). This use frequency of reference relationships can be used for prefetch. If a series of information linked by reference relationships frequently accessed is prefetched before a client issues a request, this series of information can be processed at high speed when a client issues a request, even if communications lines are congested. If there are a plurality of servers, information on the use frequency of reference relationships can be made more reliable if a plurality of servers collect and exchange the information and summarize it, than if the information is collected independently by each server. However, the prior examples 1 to 6 have not the method of exchanging among a plurality of servers a use frequency of data reference relationships. Therefore, reliability of the information on a use frequency of reference relationships is limited and the effect of prefetch is also limited.

(4) It has been a possibility of discarding an important cache when caches are replaced, because irregular and unstable communications lines have not been taken into consideration.

In the prior examples 1, 2 and 3, each server (or client) replaces caches by referring to a use history or the like. Since the prior example 4 assumes the LAN environment, the states of communications lines are not taken into consideration when the priority level of caches is determined to replace them. The prior examples 5 and 6 also assume one computer or a plurality of computers physically in tight contact with each other. Therefore, the states of communications lines are not taken into consideration when the priority level of caches is determined to replace them. In all the prior examples 1 to 6, therefore, a cache unable to be obtained under the current communications conditions or a cache taking a long time to obtain, may be discarded.

(5) While a first server accepts a request from one or more second servers, if the second servers use the first server limitlessly, the first server may be overloaded. A countermeasure for this has not been applied to the prior examples 1 to 6. It is therefore difficult for a plurality of servers to pass requests from users other than a predetermined society of a plurality of users. In the prior examples 1, 2 and 3, since the client-server system is adopted, if the server rejects a client request, this request cannot be processed. In the prior examples 4, 5 and 6, since servers of a limited number pass requests, an overload of the first server does not become a problem.

SUMMARY OF THE INVENTION

An object of the invention is to solve the above issues (1) to (5) and provide services of an information system more comfortable to users, by providing a plurality of caches to a plurality of servers.

In order to solve the issue (1), the following three techniques are provided.

(i) In acquiring data necessary for a first server (hereinafter called necessary data), this necessary data may be cached at two or more second servers among a plurality of servers using the invention method. In this case, the first server has past communications history between first and second servers, and in accordance with the communications history, selects one or more third servers from the second servers, and requests the third servers to transmit the necessary data. In accordance with the communications history, the first server can select the third server which can be expected to acquire the necessary data at high speed at present. It is therefore possible to process a client request by selectively using a communications line which can perform communications at high speed.

(ii) The first server selects two or more third servers from which the necessary data is acquired, and a request is transmitted at the same time to a plurality of servers so as to process the client request at high speed. However, in this case, responses from the plurality of servers start generally at the same time and the communications speed may be lowered. In order to avoid this, of two or more second servers, one or more third servers are requested to transmit the necessary data at once, whereas another or more fourth servers are requested to hold the transmission of the necessary data. When it is judged that it takes a long time for the third server to transmit the necessary data or that the necessary data cannot be transmitted, the stand-by fourth server immediately transmits the necessary data. It is therefore possible to process the client request at high speed even if the communications state changes.

(iii) The first server has past communications history (communications history with time) during a first time at a second time interval between the first server and one or more other servers. This communications history with time allows the first server to select a suitable time for communications, even if the communications line state changes periodically (e.g., if a communications line congested in the day time but not congested in the night time is used). With these three techniques (i) to (iii) of this invention, a communications line capable of communications at high speed can be selectively used, or a communications line is selectively used in a time zone when communications can be performed at high speed, so that the client request can be processed at high speed even under the conditions of irregular and unstable communications lines.

In order to solve the issue (2), the first server transmits part or the whole of a list of caches possessed by the first server to one or more second servers. In this case, one or more second servers are selected in accordance with the history of communications line state. The list of caches of the first server can be transmitted to the second server capable of performing communications at high speed. If the communications line between the first and second servers is normal, the second server can use the cache of the first server even if other communications lines are unstable.

In order to solve the issue (3), for the case wherein there is a high possibility that after a client requests for first data, the client requests one or more sets of second data, the first server stores a correspondence (reference information) between first and second data, and transmits this reference information to one or more second servers. With this means, each server in a plurality of servers of this invention exchanges the reference information with another server to improve the reliability of use frequency of the reference often referred. Therefore, a series of data frequently requested can be provided to the client at high speed.

If the reference information is prefetched, a number of data sets can be requested at the same time. In this invention, a plurality of servers prefetch data sets hierarchically in a pipe line manner so that effective prefetch can be performed without a bottle neck at a particular server or an overload on a particular network.

In order to solve the issue (4), the first server determines a priority level of each cache by using the history of the communications line state, in accordance with an access frequency of information unit, a last accessed time, an average throughput, an average latency, and the contents of caches of other servers. In accordance with the determined priority level, caches are replaced. It is therefore possible to prevent a cache from being discarded, which cache cannot be acquired under the current communications conditions or takes a long time to be acquired.

In order to solve the issue (5), the first server has means for limiting the transmission amount of necessary data from one or more second servers to a predetermined amount during a predetermined time, or to a predetermined number of transmissions during a predetermined time. Each of the second servers requests two or more third servers including the first server to transmit the necessary data. It is therefore possible to prevent an overload of the first server to be caused by the second servers and not to obstruct the processes of the second servers. With this means of the invention, even if one server among a plurality of servers rejects a request, another server can process the request.

With the above means, a time from when a user issues a request to a client to when the request is processed can be shortened even under the conditions of irregular and unstable communications lines of the Internet. A request by a client can be processed as much as possible even if a particular communications line is interrupted. In this manner, services of a communication system more comfortable to users can be provided.

BRIEF DESCRIPTION OF THE DRAWINGS

FIG. 6 is a flow chart illustrating processes to be executed by the server.

FIG. 7 is a flow chart illustrating processes to be executed by the server.

DESCRIPTION OF THE PREFERRED EMBODIMENTS

Embodiments of the invention will be described with reference to the accompanying drawings.
<Overall Structure>

Figure 2:
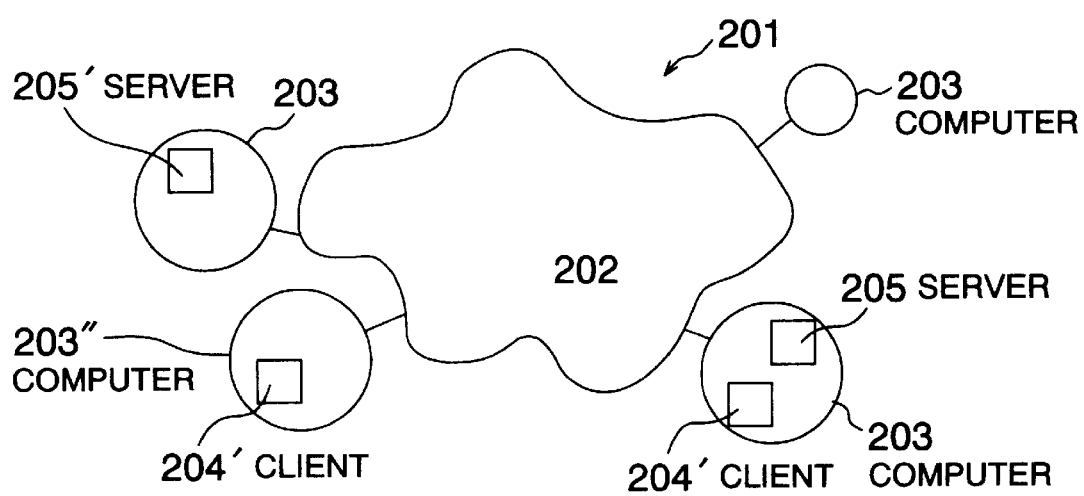
FIG. 2 is a diagram showing a distributed computer system according to an embodiment.

A computer system of this embodiment uses a distributed data management method of storing data from another information system or from a user in one or more distributed caches. FIG. 2 shows the overall structure of this embodiment. The computer system 201 of this embodiment is a distributed computer system having one or more computers 203, 203', 203", . . . interconnected by a network 202.

The network 202 may be LAN often used by the whole or part of a community (company, school or like communities) or may be the whole or part of WAN interconnecting a plurality of geographically distributed sites. The network 202 may also be a computer coupled network or a processor coupled network of parallel computers.

Each of the computers 203, 203', 203", . . . runs one or more clients, one or more servers, or both. The computer system 201 of this embodiment has at least one server 205 and at least one client 204. In the following, a server group contained in the computer system 201 of this embodiment is called a "present system" where applicable. Each of the computers 203, 203', 203", . . . may be any computer such as a personal computer, a workstation, a parallel computer, and a main frame computer. Each of the computers 203, 203', 203", . . . running a corresponding one of servers 205, 205', 205", . . . has a function of communicating with a corresponding one of clients 204, 204', 204", . . . Namely, each of the computers 203, 203', 203", . . . may be a computer terminal, a portable communications terminal (personal digital assistance PDA, hand-held personal computer HPC), a network computer or the like. The number and structure of the computers 203, 203', 203", . . . clients 204, 204', 204", . . . and servers 205, 205', 205", . . . shown in FIG. 2 are only illustrative and are not intended to limit the scope of this invention.

A client 204 communicates with a server 205 by using various protocols, such as HTTP (abbreviation for Hypertext Transfer Protocol) and FTP (abbreviation for File Transfer Protocol). The client 204 may be a WWW browser with graphic user interface, a WWW browser only with text display, a WWW client bundled in a word processor or a spreadsheet software, or a WWW proxy server. These protocols used by the client 204 and these types of the client 204 are only illustrative and do not limit the scope of the invention.

The servers 205, 205', 205", . . . obtain information to be supplied to clients from the information sources such as a WWW server, WWW proxy server, anonymous FTP server, and user, and store the information paired with URL. The servers 205, 205', 205", . . . obtain new information by periodically (e.g. one per hour) connecting the information sources, by being notified of a generation of new information by the information sources, or by other methods. These information sources and information retrieval methods used by the servers 205, 205', 205", . . . are only illustrative and do not limit the scope of the invention. The information stored in the servers 205, 205', 205", . . . is added with URL and managed by using URL. Instead of URL, other identifiers may be used if they can designate the information stored in the servers. Use of URL is not intended to limit the scope of the invention. The embodiment of the invention is independent from the type of an operating system used by a client or server, the type of a network between servers or between servers and clients, the type of a network physical layer protocol and a network transport layer protocol, and whether the server and client are on the single computer or on different computers.
<Outline of Operation of Client and Server>

Figure 1:
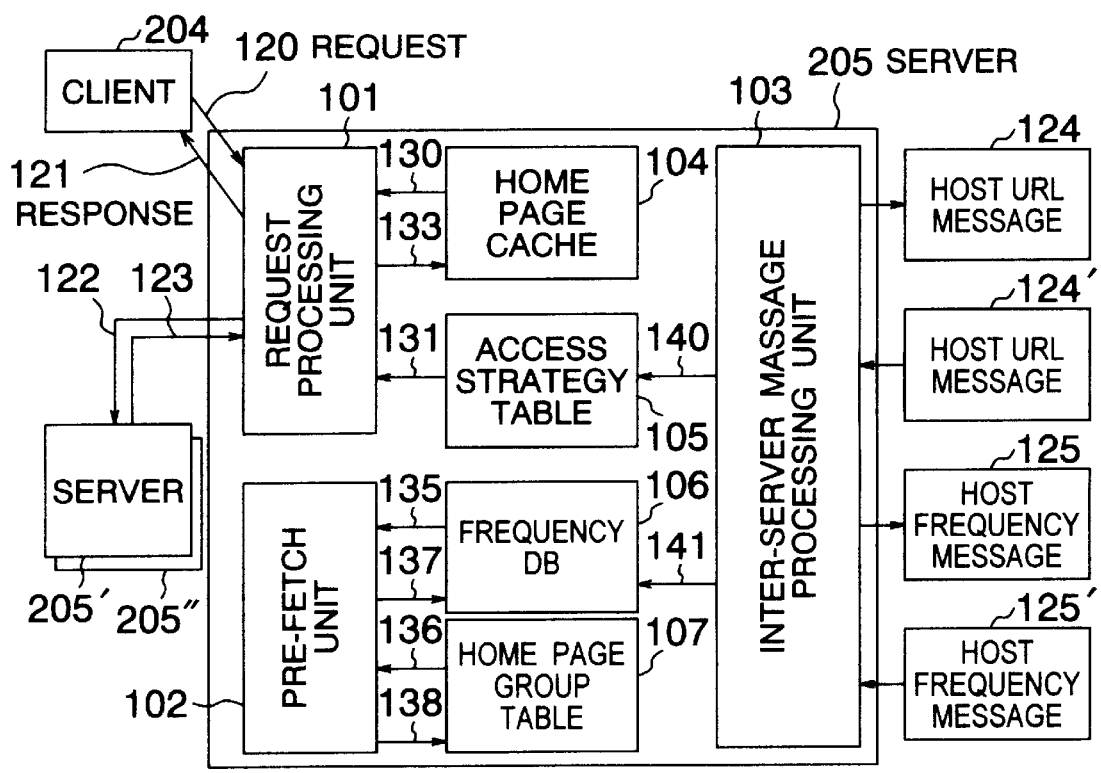
FIG. 1 is a block diagram showing the outline of the internal configuration of a server according to an embodiment.

With reference to FIG. 1, the outline of the operations of the client 204 and server 205 will be described. In FIG. 2, the network 202 interconnecting the server 205, client 204 and other servers 205', 205", . . . is not shown. Arrows in FIG. 1 indicate main data flows.

The server 205 has processing units and data structures. The processing units include a request processing unit 101, a prefetch unit 102, and an interserver message processing unit 103. The data structures include a home page cache 104, an access strategy table 105, a frequency DB 106, and a home page group table 107.

The home page cache 104 of the server 205 is stored in a non-volatile storage (such as a magnetic hard disk and an optical disk which are described hereinafter as "secondary storage" where applicable), a volatile storage (such as a main memory and a cache memory which are described hereinafter as "main storage" where applicable), or both, of the computer 203 running the server 205. The home page cache 104 is not required to be stored in one area of the non-volatile storage or volatile storage. For example, if the computer 203 running the server 205 has three magnetic hard disks, the home page cache 104 may be stored divisionally in some or all of the three magnetic hard disks. It is not essential but desirable to divisionally store the home page cache 104 in a plurality of magnetic hard disks, because the parallel access performance of the magnetic hard disks is improved and read/write of the home page cache 104 is speeded up. Caching information is an important role of the server 205. It is therefore not essential but desirable to provide the server 205 with a storage sufficiently large for constituting a large capacity home page cache 104.

In order for the client 204 to acquire first URL contents or first URL related information from the present system, a request 120 containing the first URL is transmitted to an optional first server 205 of the present system.

The request 120 is received by the request processing unit 101 which searches the home page cache 104 to check whether it contains the requested URL contents (130). If it contains, the home page cache 104 is accessed and the first URL contents are transmitted to the client 201 at a response 121.

The access strategy table 105 stores therein records indicating which URL contents the other servers 205', 205" of the present system have, and records indicating past communications speeds (e.g., throughput and latency) used by the first server 205. If the first URL contents are not contained in the home page cache 104 of the first server 205, the first server 205 refers the access strategy table 105 to determine the second servers 205', 205", . . . to which the request is transferred (131). The request 120 is transferred as a request 120 to one or more of the second servers 205', 205", . . . and to the information sources of the first URL contents. When the first URL contents are acquired as a response 121 from at least one of the second servers 205', 205", . . . and the information sources to which the request 122 was transferred, the first server 205 sends the acquired first URL contents to the client 204 as a response 121. The requests 120 and 122 and responses 121 and 123 may be transmitted via the network 202 or by using the communications function of the computers 203, 203', 203", . . .

When the first server 205 acquires the first URL contents as the response 123, it adds the first URL contents to the home page cache 104 of the first server 205 (133). In this case, a host URL message 124 indicating an addition of the first URL contents is transmitted to some or all of the other servers 205', 205", . . . of the present system. When the first URL contents are added to the home page cache 104, second URL contents may be deleted from the home page cache 104. In this case, the host URL message 124 indicating a deletion of the second URL contents is transmitted to some or all of the other servers 205', 205", . . . of the present system.

The frequency DB 106 stores frequency information indicating which URL contents was referred at what time, as will be later described. The home page group table 107 stores therein a plurality of combinations of URL contents frequently requested consecutively. After the response 121, the prefetch unit 102 of the first server 205 reflects upon the frequency DB a change in the frequency information caused by the request 120 (135). A change in the frequency information is transmitted to some or all of the other servers 205', 205", . . . of the present system, by transmitting a host frequency message 125 representative of the update contents of the frequency DB 106. The prefetch unit 102 updates the home page group table 107 in accordance with the contents of the frequency DB 106 (136).

Next, the URL contents expected to be requested in the future are determined by referring the frequency DB 106 and home page group table 107 (137 and 138). If there are one or more sets of the expected URL contents, these sets are received by the request processing unit 101, similar to the case of the request 120.

When the inter-server message processing unit 103 receives a host URL message 124' from the other servers 205', 205", of the present system, it renews the access strategy table 105 (140). When the unit 103 receives a host frequency message 125' from the other servers 205', 205", of the present system, it renews the frequency DB 106 (141).

The outline of the operations of the client 204 and server 205 has been described above. The details thereof will be given hereinunder.

<Details of Internal Operation of Server>

Figure 3:
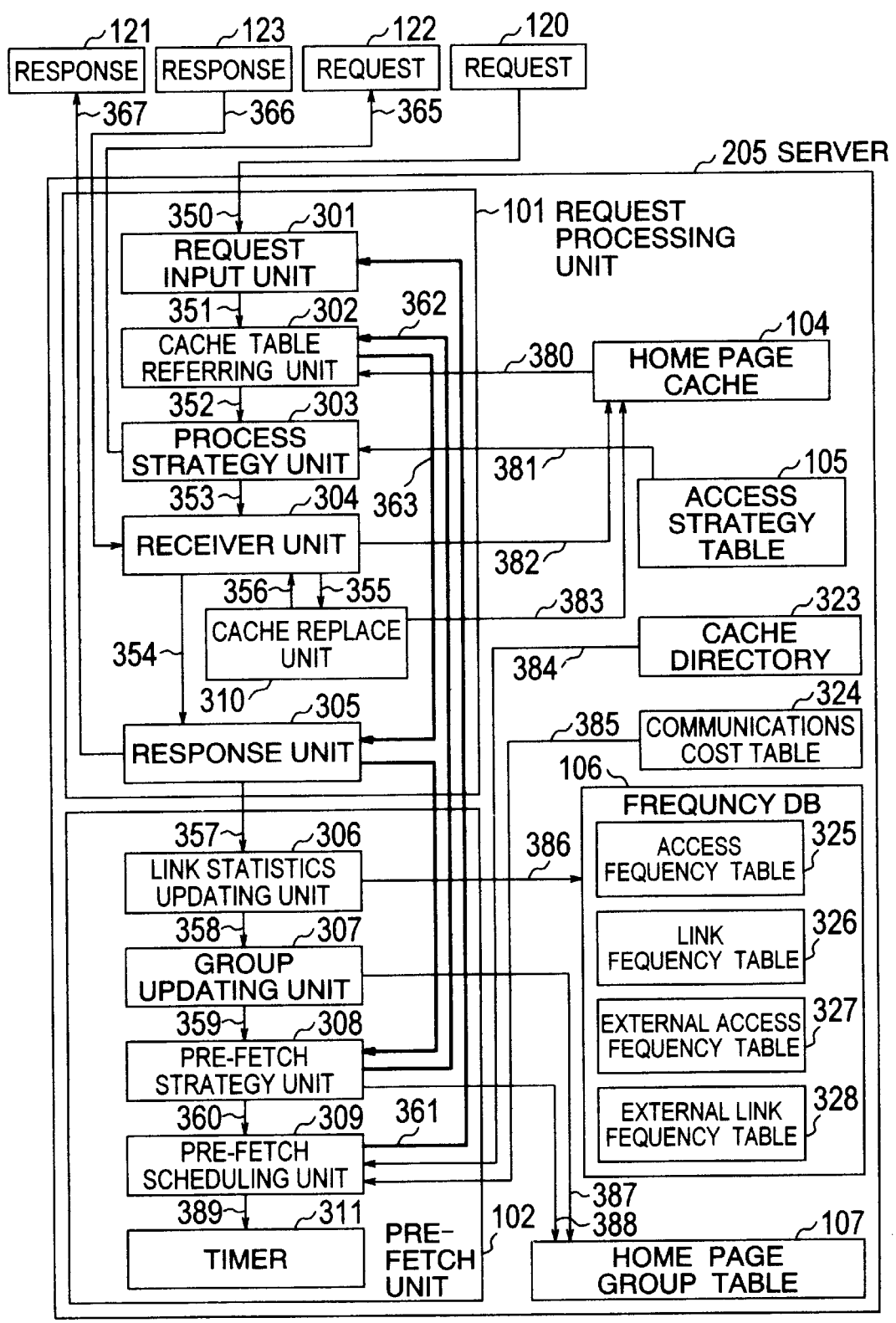
FIG. 3 is a block diagram showing the internal structure of a server.

FIG. 3 shows the internal structure of the server 205. The request processing unit 101 is constituted of a request input unit 301, a cache table referring unit 302, a process strategy unit 303, a receiver unit 304, a response unit 305, and a cache replacing unit 310. The prefetch unit 102 is constituted of a link statistics updating unit 306, a group updating unit 307, a prefetch strategy unit 308, a prefetch scheduling unit 309, and a timer 311. The inter-server message processing unit 103 is not shown in FIG. 3.

The data structures of the server 205 are constituted of the home page cache 104, the access strategy table 105, the frequency DB 106 (constituted of an access frequency table 325, a link frequency table 326, an external access frequency table 327, and an external link frequency table 328), the home page group table 107, a cache directory 323 and a communication cost table 324 both for configuring the access strategy table 105, and a host table (not shown). These data structures may be stored in one or both of the main and secondary storages. In FIG. 3, bold arrows indicate main control flows, and thin arrows indicate main data flows. In this embodiment, the necessary data as recited in the appended claims corresponds to the URL contents, the communications history as recited in the appended claims is stored in the access strategy table 105 and communications cost table 324, the data storage probability is stored in the cache directory 323, the communications history with time is stored in the frequency DB 106, and the reference information is stored in the home page group table 107. A list of data transferred between servers is transmitted in the form of a host URL message 124.

Prior to the description of the internal processes of the server 205, the outline of each data which a request is transferred.

As the host name, a symbolic host name or an IP address is used, or in some cases a combination of a symbolic host name or an IP address and a port number of TCP/IP or UDP/IP is used. Since the main objective of the host name is to designate a communications partner server or client and establish a communications path, the host name may be described as desired so long at it satisfies such an objective. The IP address and port number are only illustrative and are not intended to limit the scope of the invention.

The cache directory 323 stores therein generally a plurality of combinations of a URL 421, a host 422 and a URL presence probability. The URL 421 is a URL itself. The host 422 is a name of the server or a name of the host having an information source. The URL presence probability 423 is a probability of a presence of a home page designated by URL 421 in the computer designated by the host 422.

Figure 4:
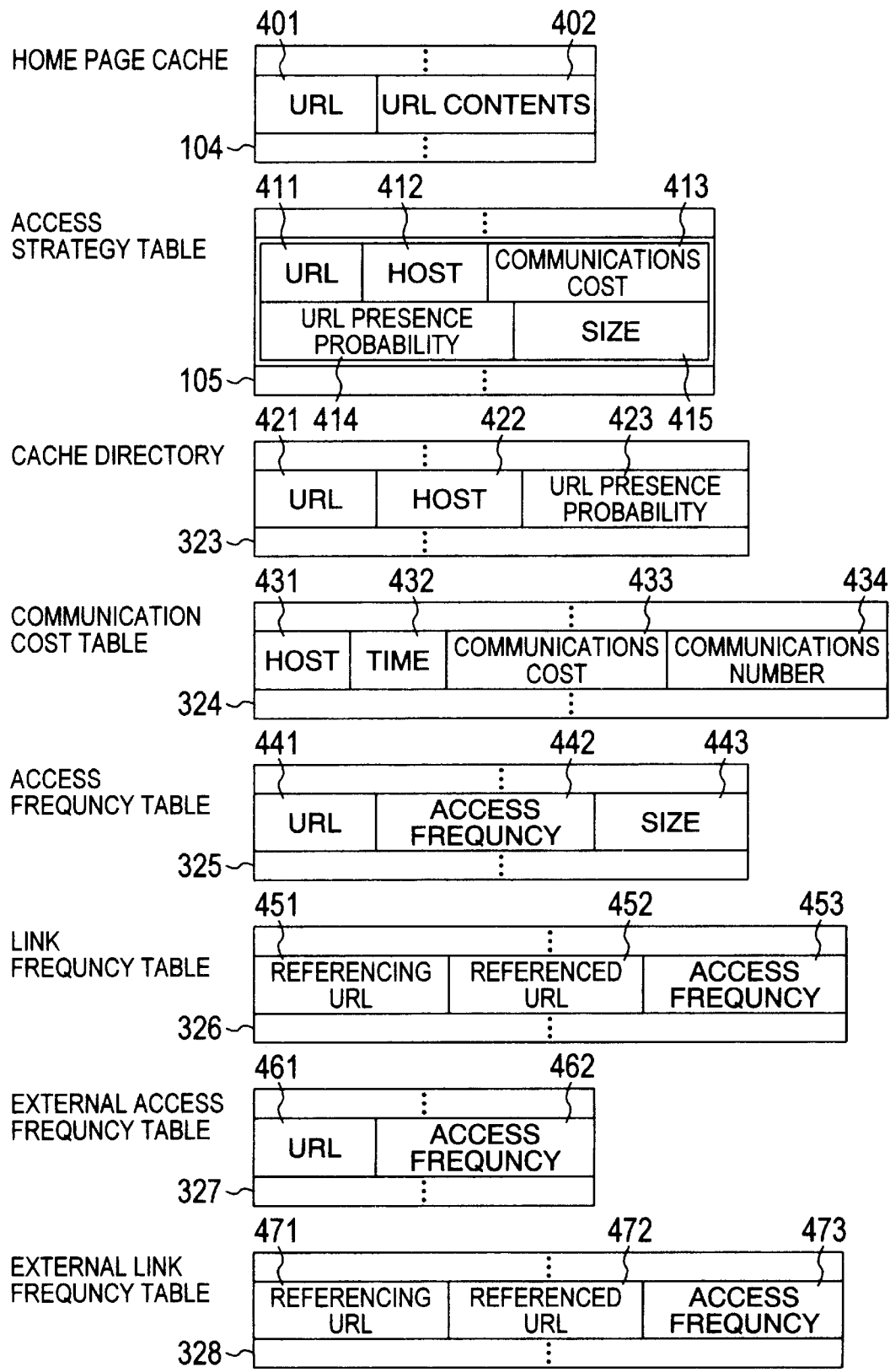
FIG. 4 is a diagram showing a data structure used by the server 205.

The communication cost table 324 stores therein generally a plurality of combinations of a host 431, a time 432, a communications cost 423, and a communication number 434. The host 431 is a name of the server or a name of the host having an information source. The time 432 stores a time and a day of the week. The communications cost 433 is represented by throughput (transferable data amount per unit time) and latency (communications delay time) of communications with the host 431 at the structure will be described first. The detailed description of each data structure will be later described together with the internal processes of the server 205. FIG. 4 shows the structures of the home page cache 104, access strategy table 105, cache directory 323, communications cost table 324, access frequency table 325, link frequency table 326, external access frequency table 327, and external link frequency table 328.

The home page cache 104 is the main cache, and stores therein generally a plurality of pairs of a URL 401 and URL contents 402.

The access strategy table 105 is a combination of the cache directory 323 and communications cost table 324 to be described below. More specifically, the access strategy table 105 stores therein generally a plurality of combinations of a URL 411, a host 412, a communications cost 413, a URL presence probability 414, and a size 415. The URL 411 is a URL itself. The host 412 is a name of the server 205 or a name of the host having an information source. The communication cost 413 is represented by using communications throughput and latency. The URL presence probability 414 is a probability of a presence of a home page designated by URL 411 in the computer designated by the host 412. The size 415 indicates the number of bytes of URL 411 at the previous last access. The access strategy table 105 is used for determining one or more second servers 205', 205", . . . to time 432 during a predetermined past period. The communications number 434 is the number of communications with the host at the time 432 during the predetermined past period.

The access frequency table 325 stores therein generally a plurality of combinations of a URL 441, an access frequency 442, and a size 443. The URL 441 is a URL itself. The access frequency 442 is the number of accesses by the server 205 to a home page represented by URL 441 during a predetermined past period C1. The access frequency 442 of this embodiment is a counter group for counting the number of accesses at what time in what day of the week during the past week. The size 443 indicates the number of bytes of URL 441 at the preceding access.

The link frequency table 326 stores therein generally a plurality of combinations of a referencing URL 451, a referenced URL 452, and an access frequency 453. The access frequency 453 indicates the number of accesses by the server 205 to a link from the referencing URL 451 to the referenced URL 452 during a predetermine past period C2. The access frequency 453 of this embodiment is a counter group for counting the number of accesses at what time in what day of the week during the past week. The external access frequency table 327 stores therein generally a plurality of combinations of a URL 461 and an access frequency 462. The URL 461 is a URL itself. The access frequency 462 indicates the number of accesses by the other servers 205', 205", . . . of the present system to a home page designated by URL 461 during the predetermined past period C1. The access frequency 462 of this embodiment is a counter group for counting the number of accesses at what time in what day of the week during the past week.

The external link frequency table 328 stores therein generally a plurality of combinations of a referencing URL 471, a referenced URL 472, and an access frequency 473. The access frequency 473 indicates the number of accesses by the other servers 205', 205", . . . to a link from the referencing URL 471 to the referenced URL 472 during the predetermined past period C2. The access frequency 472 of this embodiment is a counter group for counting the number of accesses at what time in what day of the week during the past week.

The host table stores combinations of host names. The host names in the host table include those of all the servers 205, 205', 205", . . . on the computers 203, 203', 203", . . . participating the present system.

The server 205 uses variables such as a prefetch flag, a new URL flag, and a previous last accessed URL. The prefetch flag is a variable of truth/false indicating whether the server 205 is presently prefetching or processing a request from the client 204 (or other servers 205', 205", . . . ). The initial value is false. The new URL flag is a variable of truth/false indicating whether the received URL contents are newly added to the home page cache 104. The initial value is false. The previous last accessed URL is a URL returned in response to the previous last client request. The initial value is "empty".

Figure 5:
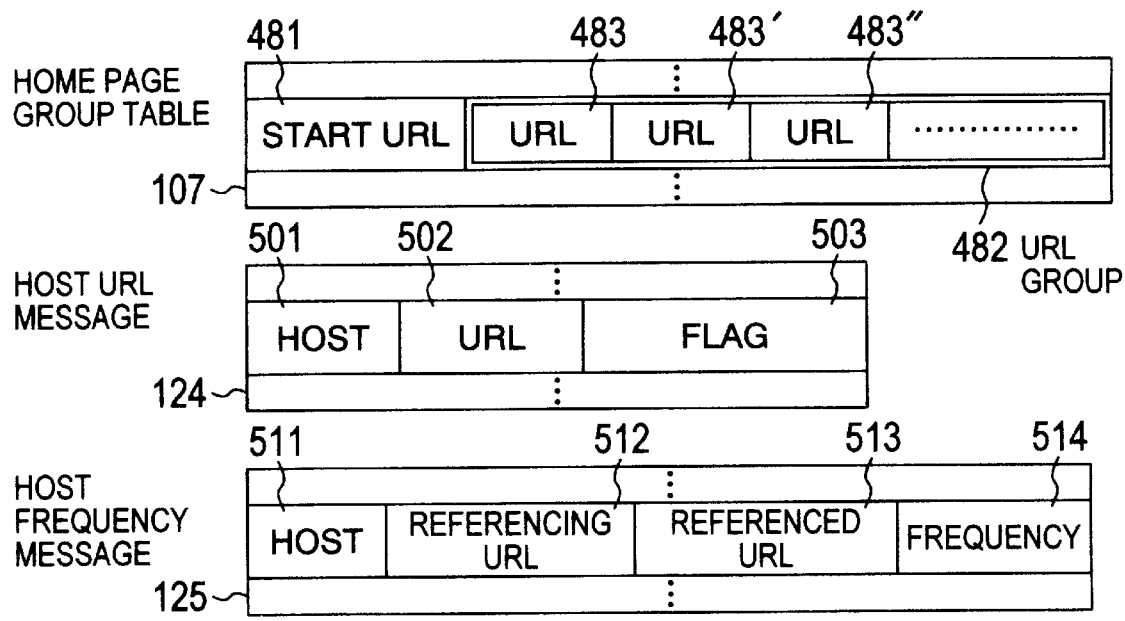
FIG. 5 is a diagram showing the data structure used by the server 205.

FIG. 5 shows the structures of the home page group table 107, host URL message 124, and host frequency message 125.

The home page group table 107 stores therein generally a plurality of combinations of a start URL 481 and a URL group 482. Each combination is a collection of URLs often accessed consecutively. The start URL 481 is single, and the URL group 482 includes one or more URLs, URL 483, URL 483', URL483", . . .

The host URL message 124 is data containing a combination of a host 501, a URL 502 and a flag 503. One host URL message 124 may contain two or more combinations. The host 501 indicates a host name, the URL 502 is a URL itself, and the flag 503 is a variable of truth/false. The host URL message 124 is used for notifying another server of whether the server designated by the host 501 has a URL designated by URL 502 (flag 503 is truth) or not (flag 503 is false).

The host frequency message 125 is data containing a combination of a host 511, a referencing URL 512, a referenced URL 513, and a frequency 514. The host 511 indicates a host name, the referencing URL 512 is a URL itself, the referenced URL 513 is a URL itself or "empty", and the frequency 514 is a counter. The host frequency message 125 is used for notifying another server 205', 205", . . . of the frequency 514, or the number of accesses by the server 205 designated by the host 511 to the link from the URL designated by the referencing URL 512 or the referencing URL to the referenced URL 513 during a predetermined past period. The values C1 and C2 may be changed when the server 205 is compiled or started up or while it is operated. The access frequencies 442, 453, 462, 473, and 514 store the number of accesses at what time in what day of the week during the past week. These frequencies are illustrative only and are not intended to limit the scope of the claim. The objective of the access frequency table 325, link frequency table 326, external access frequency table 327 and external link frequency table 328 is to record the number of accesses to what URL or what link. Other information may be recorded so long as the objective is satisfied. For example, in combination with or in place of the access frequencies 442, 453, 462, 473, and 514, final access times may be recorded to estimate the number of accesses to what URL or what link by using a least recently used (LRU) method.

With reference to FIGS. 1, 3, 6 and 7, the process flow of the first server 205 will be described assuming that the first server 205 is requested from the client 204 or other servers 205', 205", . . . to acquire the URL contents. The request input unit 301 of the first server 205 waits for a request from the client 204 or other servers 205', 205", . . . , and when there is a request, it is received (601, 350). The URL contents to be acquired are represented by a URL in the request from the client 204 or other servers 205', 205", . . . A URL contained in the request from the client 204 or other servers 205', 205", . . . will be called hereinafter a "subject URL". In the first server 205, the subject URL is passed to the cache table referring unit 302 (351). In this case, the prefetch flag is set with a "false".

The cache table referring unit 302 searches a combination having the URL 401 same as the subject URL from the home page cache 104 (602, 380). If such a combination is present (603), a control is passed to the response unit 305 (363), whereas if such a combination is not present (604), a process is passed to the process strategy unit 303 (352).

With reference to the access strategy table 105, the process strategy unit 303 selects one or more second servers 205', 205", . . . and information sources to which the request is transferred (381). First, a combination having URL 411 same as the subject URL is searched from the access strategy table 105 (605) to check whether there is one or more such combinations (606). If present (607), one or more combinations are scheduled and selected by a method to be described later (608). For each of one or more combinations selected by the scheduling and selection, the request is transferred to the servers or information sources designated by the host 412 in the order from a higher priority level scheduled (610, 365). If there is no such combination (609), the request is transferred to the information source of the subject URL (610, 365). In both of the above cases, after the request is transferred, a process is passed to the receiver unit 304 (353). The servers 205', 205", . . . and information sources to which the request was transferred are hereinafter called "request transfer destinations".

For the scheduling and selection, various algorithms may be used. Important indices are latency, throughput and communications size, from the viewpoint of network communications efficiency. Also important is a probability of a presence of information corresponding to the subject URL at the request transfer destination. In this embodiment, the following specific scheduling and selection are performed. Although the following D1, D2, D3, D4, D5 and D6 are constants, they may be changed when the server 205 is compiled or started up or while it is operated. The scheduling may be used in combination with other information possessed by the server 205, without any practical problems. For example, as the other information, information provided by a system manager to the server 205, information of similarity of an IP address, information of routing topology and the number of hops, information of a physical structure of communications lines, and the like may be used.

The sequential processes of the scheduling and selection are as follows. Of the combinations in the access strategy table 105 having URL 411 same as the subject URL, those having a throughput constant of D1 or lower in the communication cost 413 are excluded, those having a latency constant of D2 or lower in the communication cost 413 are excluded, and those having a constant of D3 or lower of the URL presence probability 414 in the communication cost 413 are excluded. A priority level (the larger the level, the higher the priority) is calculated by using an equation [URL presence probability 414/((latency of the communication cost 413+size 415)/(through put of the communication cost 413))], and combinations having a constant D4 or higher are selected. In this case, if a computer of the information source contained in the subject URL is not selected, this information source is selected as having the smallest priority level. The above sequential processes are the scheduling and selection of this embodiment.

Figure 8A:
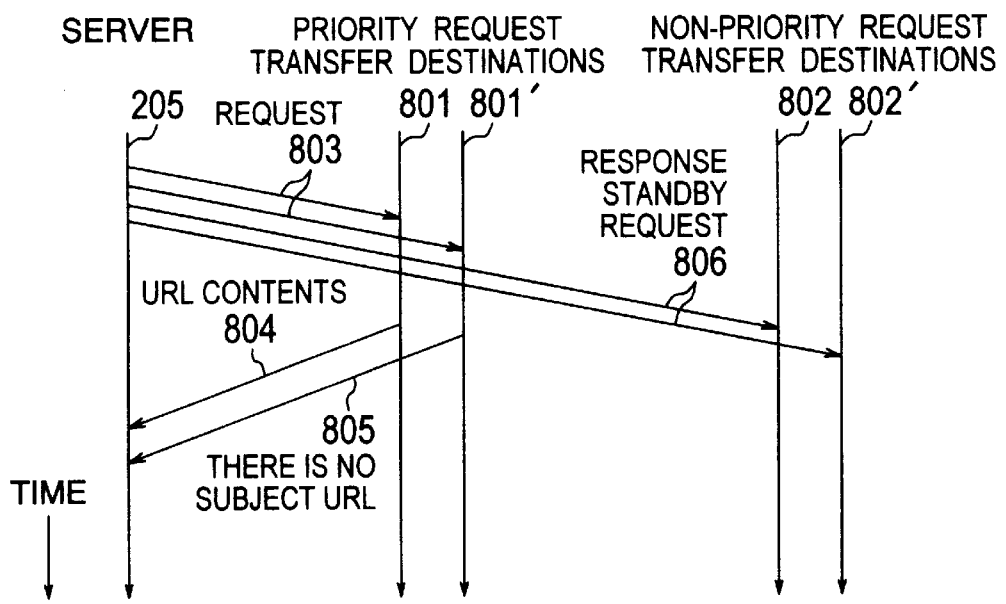
FIGS. 8A and 8B are diagrams illustrating a protocol to be used by servers for alleviating congestion.
Figure 8B:
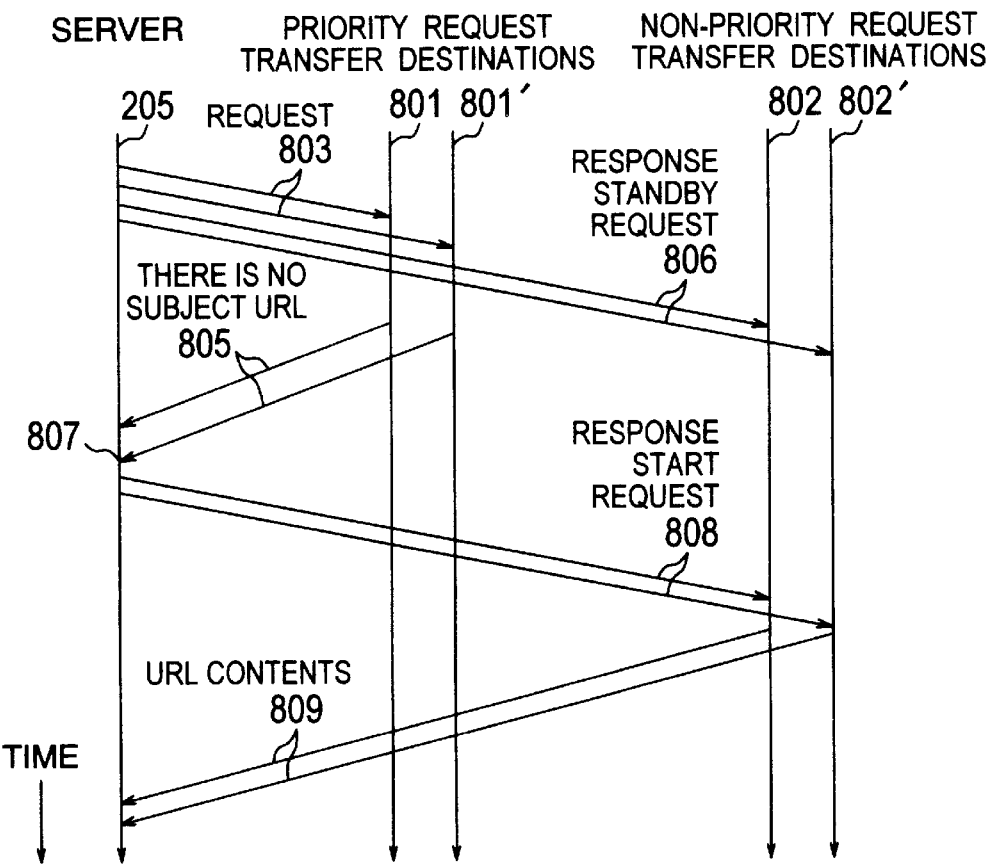

If the request is transferred to a plurality of hosts 412 at the same time, responses are returned from a plurality of request transfer destinations nearly at the same time and the network near the first server 205 may become congested. On the other hand, if the request is transferred sequentially to the plurality of hosts 412 and each response is awaited each time the request is transferred, the resultant time taken to acquire the URL contents may be delayed. In order to alleviate these problems, the following communications protocol may by used. This protocol will be described with reference to FIGS. 8A and 8B in which communications between the server 205 and the request transfer destinations is illustrated in the time axis from the earlier time to the later time. FIGS. 8A and 8B illustrate operations under two different conditions.

As shown in FIG. 8A, the request is transferred without being changed to the D5 request transfer destinations having higher priority levels (hereinafter called priority request transfer destinations 801, 801', . . . ) (803). Upon reception of the request, each of the priority request transfer destinations immediately sends the URL contents corresponding to the subject URL back to the first server 205 if the destination has the URL contents (804). Transferring the request without changing it means a request to immediately send the URL contents if the priority request transfer destination has the URL contents.

Each of the priority request transfer destinations immediately sends the URL contents corresponding to the subject URL back to the first server 205 if the destination has the URL contents, whereas if it has not the URL contents, it returns a message "there is no subject URL" (805).

The first server 205 transfers a "response standby request" of the subject URL to request transfer destinations other than the priority request transfer destinations (hereinafter called non-priority request transfer destinations 802, 802', . . . ) (806). The response standby request means to start responding if the subject URL is present and a response start request to be later described is received. If the non-priority request transfer destination has the URL contents corresponding to the subject URL, it stands by, whereas if not, it returns a message "there is no subject URL".

As shown in FIG. 8B, if all the priority request transfer destinations send the message "there is no subject URL" (805, 807), the first server 205 transfers a "response start request" (808) to one or more non-priority request transfer destinations which do not send the message "there is no subject URL" as yet. Upon reception of the response start request, the non-priority request transfer destinations start sending the URL contents corresponding to the subject URL to the first server 205 if the destinations have the URL contents (809). Each of the non-priority request transfer destinations in a standby state releases this state if the response start request does not reach until a lapse of a predetermined time D6 after the reception of the response standby request.

This protocol alleviates congestion of the network near at the first server 205, which congestion may occur if one or more priority request transfer destinations have the URL contents corresponding to the subject URL. This is because the request transfer destinations are classified into two groups and the maximum number of responses returned at the same time can be reduced. Furthermore, acquiring the URL contents corresponding to the subject URL is prevented from being delayed even if none of the priority request transfer destinations have the URL contents corresponding to the subject URL. This is because the first server 205 can transfer the response start request to the non-priority request transfer destinations without waiting for the response to the response standby request.

With the procedure of the scheduling and selection described above, since either the priority request transfer destinations or the non-priority request transfer destinations have the information source of the subject URL, it is to be noted that it is very rare that none of the request transfer destinations send the URL contents corresponding to the subject URL. However, if by any chance the URL contents corresponding to the subject URL are not sent back, receiving the URL contents corresponding to the subject URL is abandoned, in this embodiment. As a modification of this embodiment, a request may be transferred to other selected request transfer destinations. As a further modification, receiving the URL contents corresponding to the subject URL may be tried again after a lapse of a predetermined time.

The server 205 of this embodiment communicates with its clients 204, 204', 204", . . . provided with services of the server 205, as well as with other servers. The communications with other servers are essential for using the performance of the cache of the server 205 as much as possible. However, there is a fear that the communications with other servers may lower the essential services to the clients 204, 204', 204", . . . In order to solve this problem, the server 205 suppresses requests from other servers to a predetermined amount per unit time. In this embodiment, the server 205 does not accept requests from other servers during a T1 period if the URL contents more than L1 bytes were transferred to other servers during the past T1 period. In another embodiment of the invention, the server 205 does not accept requests from other servers during the T1 period if the URL contents were transferred to other servers more than L2 times during the past T1 period. The constants T1, L1 and L2 may be changed when the server 205 is compiled or started up or while it is operated.

The receiver unit 304 waits for the URL contents corresponding to the subject URL to be sent back from one or more request transfer destinations (366), and thereafter the communications cost table 324 is updated.

A response for the subject URL is waited for during a predetermined period T2 (611). It is checked whether there is a response (612). If there is a response (613), the URL contents contained in the response are stored as a new combination in the home page cache 104 (614, 382). In this case, the subject URL is used as a URL 401 of the new combination, and the received URL contents are used as URL contents 402. It is checked whether the total memory amount of the home page cache 104 exceeds a constant C3 after the reception of the URL contents corresponding to the subject URL (or during the reception thereof) (615). A control is passed to the cache replacing unit 310 to be later described to perform a cache replacing process, only if the amount exceeds the constant C3 (616, 617 in FIG. 6, and 355, 356 in FIG. 3). If the URL contents corresponding to the subject URL are not received (619), i.e., if all the request transfer destinations send the message "there is no subject URL", then a control is passed to the response unit 305 without processing the cache 104 (354). The constants T2 and T3 may be changed when the server 205 is compiled or started up or while it is operated.

Figure 9:
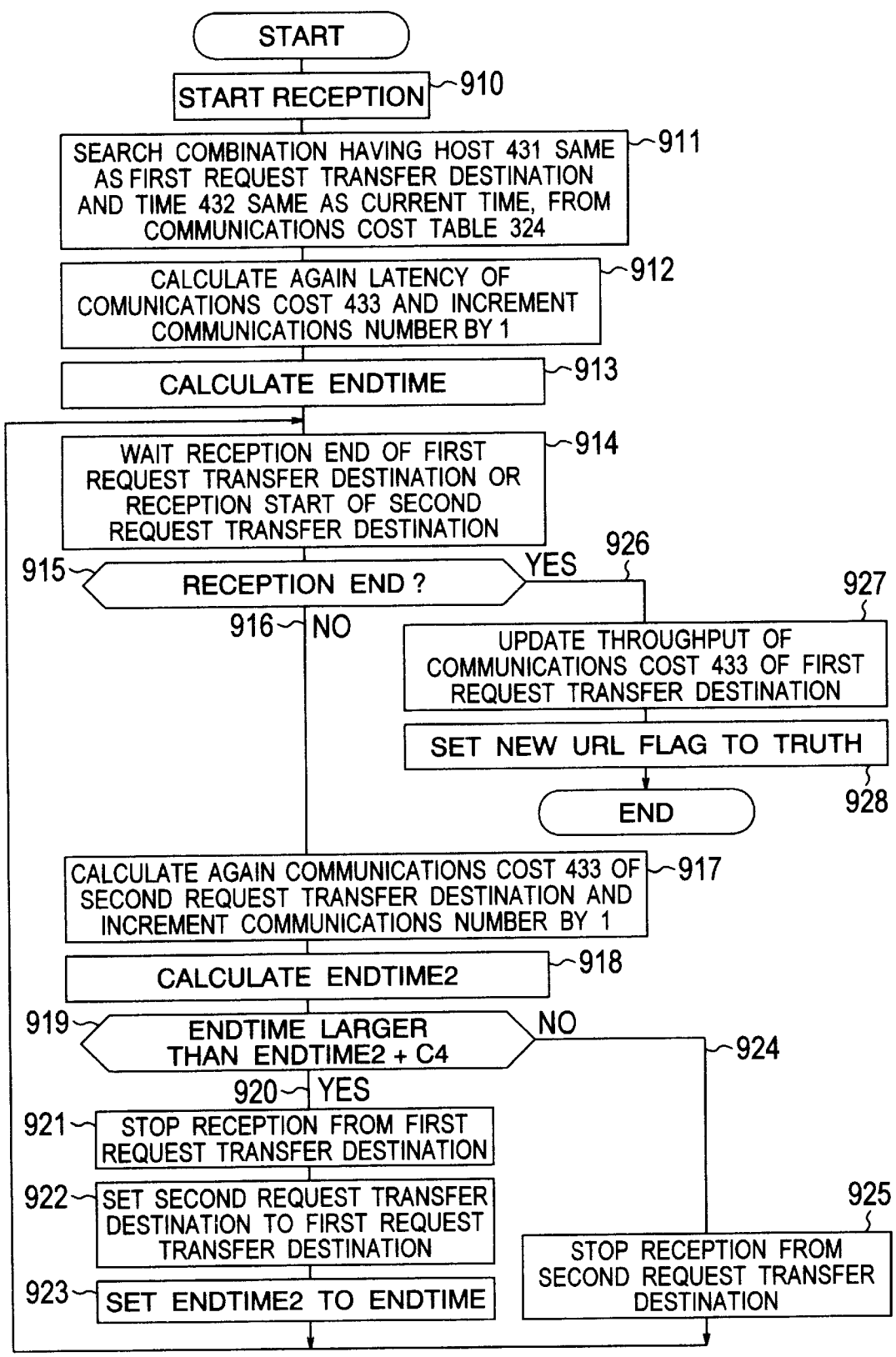
FIG. 9 is a flow chart illustrating a process of updating a communications cost table.

Updating the communications cost table 324 is performed by the procedure illustrated in FIG. 9. When the URL contents corresponding to the subject URL start being received from a first request transfer destination (910), the combination in the communications table 324 corresponding to the first request transfer destination is updated. This updating is performed by the following procedure.

(1) A combination is searched, having the host 431 same as the first request transfer destination and the time 432 same as the current time (911). The latency of the communications cost 433 is calculated again and the communications number 434 is incremented by 1 (912). If the combination cannot be found at 911, a new combination is formed in the communications cost table 324 and initialized as having the host 431 same as the first request transfer destination, the time 432 same as the current time, and the communications number 434 of "1". The latency of the communications cost 433 is initialized to the current latency (a time from a request transfer to the current time if the first request transfer destination is the priority request transfer destination, or a time from a response start request transfer to the current time if the first request transfer destination is the non-priority request transfer destination). If the combination is found at 911, the latency of the communications cost 433 is calculated again by using the current latency and the values of the communications cost 433 and communications number 434, and the communications number 434 is incremented by 1.

(2) Next, a reception end time ENDTIME of the first request transfer destination is estimated through calculation (913). This calculation is performed in the following manner. A combination is searched from the access strategy table 105, having URL 411 same as the subject URL and the host 412 same as the first request transfer destination. By using the values of the communications cost 413 and size 415 of the searched combination, ENDTIME is calculated as (current time+(size 415/throughput of communications cost 413)).

(3) Next, either a start of the URL contents corresponding to the subject URL from a second request transfer destination or an end of reception from the first request transfer destination is waited (914).

(4) It is checked whether the reception from the first request transfer destination has been completed (915). If a reception from the second request transfer destination starts before the reception from the first request transfer destination is completed (916), a combination in the communications cost table 324 corresponding to the second request transfer destination is updated in the similar manner to the first request transfer destination (917), and a reception end time ENDTIME2 from the second request transfer destination is calculated in the similar manner to the reception end time ENDTIME of the first request transfer destination (918). It is checked whether ENDTIME is larger than ENDTIME2+a constant C4 (919). If larger (9920), a reception of the first request transfer destination is stopped (921), the first request transfer destination is replaced by the second request transfer destination (922), and ENDTIME2 is set to ENDTIME (923) to return to 914. The constant C4 may be changed when the server 205 is compiled or started up or while it is operated. If ENDTIME is equal to or lower than ENDTIME2+the constant C4 (924), a reception from the second request transfer destination is stopped (925).

If a reception from the first request transfer destination is completed at 915 (926), the throughput of the communications cost 433 of a combination corresponding to the first request transfer destination in the communications cost table 324 is calculated from a current throughput and the values of the communications cost 433 and communications number 434 (927). The current throughput is obtained by dividing the size of the received URL contents by a time from the request transfer to the current time if the first request transfer destination is the priority request transfer destination, or by a time from the response start request transfer to the current time if the first request transfer destination is the non-priority request transfer destination. The new URL flag is set with truth (928). The updating procedure of the communications cost table 324 has been described above.

The response unit 305 operates in the following manner. It is checked whether the prefetch flag is "truth" (620). If truth, a control is passed to the prefetch strategy unit 308 (621, 364). If the prefetch flag is "false" (622), it is checked whether the URL contents corresponding to the subject URL have been received (623). If not received (624), the message "there is no subject URL" is sent to the client 204 or another server received the request (367), and thereafter (625) a control is passed to the request input unit 301 to wait for a request from a new client 204 or another server (626). If the URL contents corresponding to the subject URL have been received (627), the URL contents are sent to the client 204 or another server received the request (628, 367).

It is checked whether the new URL flag is truth (529). If truth (630), after the host URL message 124 is transmitted (631), a control is passed to the link statistics updating unit 306 (632, 357). If the new URL flag is false (636), a control is passed directly to the link statistics updating unit 306 (357).

If the new URL flag is truth, it means that one or more combinations are added to the home page cache 104. Therefore, the host URL message 124 is transmitted. After the new URL flag is set with false, a new host URL message 124 having one combination is generated. The host name of the first server 205 is set to the host 601 of the combination, the subject URL is set to URL 502, and truth is set to the flag 503. The host URL message 124 having the combination is transmitted to one or more other servers 205', 205", . . . contained in the host table. For example, of the combinations in the host table, a combination containing the first server 205 is searched, and the host URL message 124 generated in the above manner may be transmitted to one or more host names excepting the host name of the first server 205. Alternatively, the host URL message 124 having the combination may be transmitted to each host name stored in the combinations in the host table. Instead of transmitting the host URL message 124 having one combination to the other servers 205', 205", . . . , the host URL message 124 having collected several combinations may be transmitted to the other servers 205', 205", . . . The first method can limit a communications coverage to relatively near servers 205', 205", . . . , and the last method can reduce the communications number.

The link statistics updating unit 306 updates the access frequency table 325 and link frequency table 326 to thereby record the access frequency of the subject URL and the access frequency of a specific link to the subject URL (386). This procedure will be detained hereinunder.

Of the combinations in the access frequency table 325, a combination having URL 441 same as the subject URL is searched (701). If such a combination is not present, a new combination is formed in the access frequency table 325. The new combination is initialized as having URL same as the subject URL, and all 0s of the counter group of the access frequency 442. A counter corresponding to the current time of the access frequency 442 in the searched or newly formed combination is incremented by 1, and the size 443 is stored with the number of bytes of the URL contents corresponding to the subject URL.

Next, it is checked whether there is a hyper text link to the subject URL from the previous last accessed URL (702). If such a link is present (703), the link frequency table 326 is updated (704). Specifically, in updating the link frequency table 326, a combination is searched from the combinations in the link frequency table 326, having the referencing URL 451 same as the previous last accessed URL and the referenced URL 452 same as the subject URL. If such a combination is not present, a new combination is formed in the link frequency table 326, and initialized as having the referencing URL 451 same as the previous last accessed URL, the referenced URL 452 same as the subject URL, and all 0s of the counter group of the access frequency 453. A counter corresponding to the current time in the access frequency 453 is incremented by 1. After the subject URL is set to the previous last accessed URL, a control is passed to the group updating unit 307 (705, 358).

If it is judged that there is not a link in step 702 (706), the subject URL is set to the previous last accessed URL and a control is passed to the prefetch statistics unit 308.

In the group updating unit 307, the home page group table 107 is updated (707, 387). Consider a collection of URLs frequently accessed consecutively, it can be thought of that there is a small number of URLs first accessed when this collection is accessed. In this embodiment, only when such a small number of URLs are found, a control is passed from the link statistics updating unit 306 to the group updating unit 307 under the above-described judgement of the link statistics updating unit 306.

The group updating unit 307 operates in the following manner. A combination is searched from the home page group table 107, having the start URL 481 same as the subject URL. If there is such a combination, this combination is deleted from the home page group table 107. Next, a new combination is formed in the home page group table 107 and initialized as having the start URL 481 same as the subject URL, and the URL group 482 of one or more URLs having a probability of a constant C5 or higher of being consecutively accessed from the subject URL. This probability of being consecutively accessed from the subject URL can be calculated by using the access frequency table 325, external access frequency table 327, link frequency table 326, and external link frequency table 328. The constant C5 may be changed when the server 205 is compiled or started up or while it is operated. The probability of consecutively accessing the second URL from the first URL can be estimated as $(B/A) \times (D/C)$, where: A is an access frequency of the first URL (represented by a total value of the counter group of the access frequency 442 in the combination in the access frequency table 325 having URL 441 same as the first URL); B is an access frequency of the second URL from the first URL (represented by a total value of the counter group of the access frequency 453 in the combination in the link frequency table 326 having the referencing URL 451 same as the first URL and the referenced URL same as the second URL); C is an external access frequency of the first URL (represented by a value of the counter of the access frequency 462 in the combination in the external access frequency table 327 having URL 461 same as the first URL; and D is an external access frequency of the link from the first URL to the second URL (represented by a value of the counter of the access frequency 473 in the combination in the external link frequency table 328 having the referencing URL 471 same as the first URL and the referenced URL 472 same as the second URL). If the value A or B is 0, the probability of consecutively accessing the second URL from the first URL is 0. If the value C or D is 0, the probability of consecutively accessing the second URL from the first URL is set to (B/A).

There is a case wherein a link from the first URL to the second URL is not present, but there are a link from the first URL to a third URL, a link from the third URL to a fourth URL, . . . , a link from an N-th URL to the second URL. In this case, the probability of consecutively accessing the second URL from the first URL is p2×p3×, . . . , ×pN, where: p2 is a probability of consecutively accessing the third URL from the first URL; p3 is a probability of consecutively accessing the fourth URL from the third URL, . . . , pN is a probability of consecutively accessing the second URL from the N-th URL. For such transition closure calculation, a well know method such as Dijkspra algorithm may be used which is described in a document "Data Structure and Algorithm" by Aho, Baifukan, Information Processing Series 11, 1987, at Section 6.3.

After the above processes, a control is passed to a prefetch statistics unit 308 (359).

The prefetch strategy unit 308 determines the URL contents corresponding to the prefetch URL group including one or more URLs likely to be accessed immediately after the subject URL is accessed, and receives the prefetch group URL group at the home page cache 104 without a request from the client 204 or other servers.

It is first checked whether a request has been received from the client 204 or other servers (708). If received (709), the prefetch flag is set with "false" and a control is passed to the request input unit 301.

If a request has not been received (710), it is checked whether the prefetch flag is truth (711).

If the prefetch flag is false (712), a combination containing the subject URL is searched from the home page group table 107 (388). One or more URLs other than the subject URL contained in the searched combination is set to the prefetch URL group (713). At this time, the prefetch flag is set with "truth".

If the prefetch flag is "truth" (714), URL under prefetch is delated from the prefetch URL group (715). In this case, if the prefetch URL group becomes empty, the prefetch flag is set with "false".

It is checked whether one or more URLs are contained in the prefetch group (718). If contained (717), URL under prefetch is picked up from the prefetch URL group (718) and is considered as the subject URL to thereafter pass a control to the cache table referring unit (361) and start receiving URL under prefetch in the manner described earlier. If not contained (718), a control is passed to the prefetch scheduling unit 309 (360). As apparent from the above procedure, prefetch is activated by a request not only from the client but also from other servers. Namely, a plurality of servers distributed hierarchically can perform a series of prefetch.

The prefetch scheduling unit 309 prepares for acquiring URL when the network becomes less congested, URL being considered to be accessed in the future and not present in the home page cache 104. The prefetch scheduling unit 309 operates in the following manner.

A combination having the start URL 481 same as the previous last accessed URL is searched from the home page group table 107 to select the combination corresponding to the previous last accessed URL from the home page group table 107.

If such a combination is present, a prefetch time for each of one or more first URLs stored in the URL group 482 is determined from the communications cost table 324 and cache directory 323 (721, 384, 385). This is performed as in the following.

If the URL contents of the first URL are present in the home page cache 104, no process is executed, whereas if not present, a combination having URL 421 same as the first URL is searched from the cache directory 323. If such a combination is not present, no process is executed, whereas if there are one or more combinations, one combination is selected which has the highest URL presence probability 423, and the host 422 of this selected combination is used as the host to be accessed in the future. Next, a first combination is searched from the communications cost table 324, having the host 431 same as the host of the selected combination. If such a combination is not present, no process is executed. If there are a plurality of first combinations, a second combination is searched from the access frequency table 325, having URL 441 same as the first URL. If there is such a second combination, a third combination is selected from the first combinations, which has a minimum value of ((size 443 of the second combination/throughput of the communications cost 433 of the first combination)+latency of the communications cost 433 of the first combination). If there is no second combination, one third combination is selected which has a minimum value of (latency of the communications cost 433 of the first combination/throughput of the communications cost 433 of the first combination).

A time next corresponding to the time 432 of the third combination is called a "prefetch time". For example, if the time 432 is "Wednesday, 23:40" and the current time is January 3, Tuesday, 3:00", then the prefetch time is January 4, Wednesday, 23:40.

Next, the prefetch time of one or more URLs calculated at 721 is set to the timer 311 (722, 389). The timer 311 operates to pass the request of the first URL to the cache table referring unit 302 at the time 432 in order to receive the URL contents corresponding to the first URL in the manner described earlier. After this setting process of the timer 311, a control is passed to the request input unit 301 (362).

The procedure of the prefetch scheduling unit 309 has been described above.

<Cache Replacement>

The cache replacing unit 310 partially deletes the home page cache 104 (383). The following "cache value" of each of some or all combinations in the home page cache 104 is calculated.

The cache value of the first URL is calculated by using the access strategy table 105 and access frequency table 325. One or more first combinations are searched from the access strategy table 105, having URL 411 same as the first URL. If there are a plurality of first combinations, one first combination having a minimum value of (latency of the communications cost 413+(size 415/throughput of the communications cost 413)) is selected. A second combination is searched from the access frequency table 325, having URL 411 same as the first URL.

The cache value of the first URL is ((A×B)/size 415 of the first combination), where A is ((size 41/throughput of the communications cost 413)+latency of the communications cost 413) of the first combination, and B is the access frequency of the first URL (i.e., a total value of the counter group of the access frequency 442 of the second combination). If by any change there is no first or second combination, the cache value of the first URL is considered to be 0.

After the cache value of each of some or all combinations in the home page cache 104 is calculated, combinations in the home page cache 104 are deleted in the order from the minimum cache value. This deletion from the home page cache 104 continues until the total of combinations in the home page cache 104 becomes equal to or smaller than the constant C3.

If one or more combinations are deleted from the home page cache 104, the host URL message 124 is transmitted by the following procedure. The host URL message 124 is newly generated, and a new combination is formed in the host URL message 124 for each of the deleted combinations. Each new combination has the host 501 same as the host name of the first server 205, URL 502 same as URL 401 of the deleted combination, and flag 503 of false. The generated host URL message 124 is transmitted to one or more other servers 205', 205", . . . contained in the host table. A method of determining the transmission destinations is the same as the case of the host URL message 124 which is used when one or more combinations are added to the home page cache 104.

<Timer Process>

The server 205 performs the above-described series of processes as well as a process which is periodically performed in response to the timer 311. Each of the following processes to be executed in response to the timer is performed only while the request input unit 301 waits for a request from the client 204 or other servers, in order to avoid any conflict with the main flow.

The timer 311 operates to periodically reconfigure the access strategy table 105 by using the cache directory 323, communications cost table 324 and access frequency table 325. The reason for this is that although the communications cost table 324 mainly stores the communications costs with each host at what time in what day of the week at the time 432, the access strategy table 105 stores current communications costs with each host. In this embodiment, since the time 432 stores information of each hour, the access frequency table 325 is reconfigured once per hour. The reconfiguring procedure is apparent from the contents of the access strategy table 105, cache directory 323, communications cost table 324 and access frequency table 325.

The timer 311 operates to periodically generate the host frequency message 125 from the access frequency table 325 and link frequency table 326 and transmit it to one or more other servers 205', 205", . . . contained in the host table. This procedure is performed in the following manner.

First, one host frequency message 125 is generated. Next, a new combination is added to the host frequency message 125 for each of all combinations in the access frequency table 325. The added combination has the host 511 same as the host name of the first server 205, the referencing URL 512 same as URL 441 of the combination in the access frequency table 325, the referenced URL 513 of "empty", and the frequency 514 of a total value of the counter group of the access frequency 442 of the combination in the access frequency table 325. Next, a new combination is added to the host frequency message 125 for each of all combinations in the link frequency table 326. The added combination has the host 511 same as the host name of the first server 205, the referencing URL 512 same as the referencing URL 451 of the combination in the link frequency table 326, the referenced URL 513 same as the referenced URL 452 of the combination in the link frequency table 325, and the frequency 514 of a total value of the counter group of the access frequency 453 of the combination in the link frequency table 326. Next, a combination having the first server 205 is searched from the combinations in the host table. In accordance with searched combinations, the host frequency message 125 generated by the above procedure is transmitted to one or more hosts excepting the host of the first sever 205. The timer 311 also operates to transmit the host frequency message 125 generated by the above procedure to one or more hosts stored in combinations not containing the first server 205 searched from the host table at a frequency smaller than the transmission of the host frequency message 125 to the hosts stored in combinations containing the first server 205 (e.g., once per ten transmissions relative to the combinations containing the first server 205).

The timer 311 also operates to periodically recalculate the URL presence probability 423 for each of all the combinations in the cache directory 323. This is performed in the following manner. For each of the combinations in the cache directory 323, the URL presence probability 423 subtracted by a constant C6 is stored in the URL presence probability 423. If the subtracted result is equal to a constant C7 or smaller, C7 is stored in the URL presence probability 423. In this case, the constants C6 and C7 may be changed when the server 205 is compiled or started up or while it is operated.

<Message Process>

When the inter-server message processing unit 103 of the first server 205 receives the host URL message 124 from other servers 205', 205", . . . , the cache directory 323 is updated by the following procedure. For each of first combinations with the flag 503 of truth in the host URL message 124, a second combination having the host 422 same as the host 501 of the first combination and URL 421 same as URL 502 of the first combination is searched from combinations in the cache directory 323. If there is such a second combination, the URL presence probability 423 of the second combination is set to 1. If there is no second combination, a new combination is formed in the cache directory 323 and initialized as having the host 422 same as the host 501, URL 421 same as URL 502, and the URL presence probability 423 of 1.

For each of third combinations with the flag 503 of false in the host URL message 124, a fourth combination having the host 422 same as the host 501 of the third combination and URL 421 same as URL 502 of the third combination is searched from combinations in the cache directory 323. If there is such a fourth combination, it is deleted.

When the inter-server message processing unit 103 of the first server 205 receives the host frequency message 125 from other servers 205', 205", . . . , the external access frequency table 327 and external link frequency table 328 are updated by the following procedure.

For each of first combinations with the referenced URL 513 of "empty" in the received host frequency message 125, a second combination having URL 451 same as the referencing URL 512 of the first combination is searched from combinations in the external access frequency table 327. If there is such a second combination, the frequency 514 of the first combination is added to the access frequency 462 of the second combination, and the addition result is stored in the access frequency 462 of the second combination. If there is no second combination, a new combination is formed in the external access frequency table 327 and initialized as having URL 461 same as the referencing URL 512 of the first combination and the access frequency 462 same as the frequency 514 of the first combination.

For each of third combinations with the referenced URL 513 of "empty" in the host frequency message 125, a fourth combination having referencing URL 471 same as the referencing URL 512 of the third combination and the referenced URL 472 same as the referenced URL 513 of the third combination is searched from combinations in the external link frequency table 328. If there is such a fourth combination, the frequency 514 of the third combination is added to the access frequency 473 of the fourth combination, and the addition result is stored in the access frequency 473 of the fourth combination. If there is no fourth combination, a new combination is formed in the external link frequency table 328 and initialized as having the referencing URL 471 same as the referencing URL 512 of the third combination, the referenced URL 472 same as the referenced URL 513 of the third combination, and the access frequency 473 same as the frequency 514 of the third combination.

If the program realizing the invention method and to be executed by a computer is stored in a recording 58 medium, the invention method can be performed at a desired site.

According to the present invention, a user connects a desired server by using a client and requests information to the server. In this case, a plurality of servers can shield irregular and unstable natures of communications lines. Even if throughput and latency of each communications line between servers are different, each server exchanges communications information to select an optimum server which can acquire information at the highest speed. Therefore, irregular nature of communications lines can be eliminated by selecting and using a communications line which can acquire information at the highest speed. By exchanging communications information between servers, each server can take into consideration, for example, a change in line congestion with time zone and day of the week, and a change in a routing pattern to be caused by an enhancement of one communications line and hence new congestion or alleviated congestion of another communications line. Accordingly, each server selects another server which can acquire information at the highest speed and selects a communications line which can acquire information at the highest speed. In this manner, unstable nature of communications line can be avoided.

What is claimed is:

1. A distributed data management method used by a process as a client using one or more sets of data and by two or more processes as servers providing data designated by a request from the client, in a computer system having two or more computers each executing one or more processes and interconnected by a network, the method comprising the steps of:
   (1) storing in memory of each of a plurality of servers past communications history between said each server and others of said servers;
   (2) receiving from a first server a request for data, and selecting one or more third servers for transmitting the requested data at high speed from second servers which store the requested data based on communications history stored in the memory of said first server; and
   (3) transmitting the requested data to said first server from said one or more third servers.

2. A distributed data management method according to claim 1, wherein said storing step (1) includes a step of storing throughput representative of a transferrable data amount per unit time and latency representative of communications delay time.

3. A distributed data management method according to claim 1, wherein said storing step (1) includes a step of storing the communications history including a size of the necessary data.

4. A distributed data management method according to claim 1, wherein said storing step (1) includes a step of storing the communications history including a data storage probability predicted by said each server, said data storage probability indicating a possibility that said others of said servers store the requested data.

5. A distributed data management method according to claim 1, wherein said selecting step (2) includes a step of predicting a time taken to complete the transfer of the necessary data from the communications history and a step of selecting one or more third servers from one or more second servers if the predicted communications completion time is equal to or shorter than a predetermined value.

6. A distributed data management method according to claim 5, wherein the predicting step is performed by using an equation (the latency+(the size of the necessary data/the throughput)).

7. A distributed data management method according to claim 4, wherein said selecting step (2) includes a step of selecting one or more third servers from one or more second servers if a product of the data storage probability and the communications completion time is equal to or smaller than a predetermined value.

8. A distributed data management method according to claim 4, wherein said transmission requesting step (3) includes a step of updating the communications history of all of two or more servers stored in the memory, when communications between first and second servers is executed.

9. A distributed data management method used by two or more processes as servers in a computer system having two or more computers each executing one or more processes and interconnected by a network, comprising the steps of:
   performing a process in a first server of requesting two or more second servers to transmit necessary data to said first server in accordance with a possibility of a presence of the necessary data in said two or more second servers,
   wherein said process comprises the steps of:
      (1) selecting by said first server one or more third servers from two or more second servers,
      (2) requesting the selected third server to transmit the necessary data, and
      (3) requesting the second server other than the third server to hold a transmission of the necessary data, and
   wherein said selecting step (1) comprises the steps of:
      storing by the first server past communications history between the first server and the second servers in a memory, and
      selecting the third server from the second servers by using the past communications history.

10. A distributed data management method according to claim 9, wherein said requesting step (2) includes a step of requesting by the first server some or all of the second servers not selected as the third server to immediately transmit the necessary data, if some or all of the third servers sends a message that the necessary data cannot be transmitted, to the first server.

11. A distributed data management method according to claim 10, wherein said requesting step (2) includes a step of continuing a transmission only from one or more fourth servers and stopping a transmission from other servers, after two or more second servers starts a transmission of the necessary data.

12. A distributed data management method according to claim 11, wherein said selecting step (1) includes a step of selecting the third server and the fourth server.

13. A distributed data management method used by a process as a client using one or more sets of data and by two or more processes as servers in a computer system having two or more computers each executing one or more processes and interconnected by a network, the method comprising the steps of:
(1) storing by a first server in a memory, past communications history with time during a first time at a second time interval between the first server and two or more second servers;
(2) predicting by the first server a time when prefetch data can be acquired at high speed from one or more second servers having a possibility of possessing the prefetch data, by using the communications history with time, in order to request servers other than the first server to acquire the prefetch data before a request from the client, the prefetch data being expected to have a high possibility to be requested by the client in a future; and
(3) requesting by the first server at the predicted time the third server selected from at least some of the second servers to transmit the prefetch data.

14. A distributed data management method according to claim 13, wherein said storing step (1) includes a step of storing the communications history with time containing a history of throughput of communications during the first time at the second time interval and a history of latency of communications during the first time at the second time interval.

15. A distributed data management method used by two or more processes as servers in a computer system having two or more computers each executing one or more processes and interconnected by a network, the method comprising the steps of:
(1) storing by a first server past communications history between said first server and second servers in a memory;
(2) selecting one or more third servers from second servers associated with the first server, by using the communications history; and
(3) transmitting from the first server to the second server at least part of a list of data possessed by the first server.

16. A distributed data management method according to claim 15, wherein said transmitting step (3) includes a step of determining a data presence probability of the first server in accordance with a difference between a time when the data list is transmitted and a current time.

17. A distributed data management method according to claim 16, wherein said transmitting step (3) includes a step of lowering the data presence probability at a predetermined time interval after the data presence probability is set to 1 when the data list is transmitted.

18. A distributed data management method used by a process as a client using one or more sets of data and by two or more processes as servers, in a computer system having two or more computers each executing one or more processes and interconnected by a network, the method comprising the steps of:
(1) storing at least one of past communications history between a first server and second servers and request history from the client to the first server in a memory,
(2) determining by the first server one or more second data sets having a higher frequency of a request following a request for a first data set in accordance with the request history;
(3) storing by the first server, as reference relationship information, data representative of a combination of a name of the first data set and names of second data sets; and
(4) exchanging the reference relationship information of the first server with reference relationship information of one or more second servers.

19. A distributed data management method according to claim 18, wherein said determining step (2) includes a step of determining by the first server one or more second data sets having a higher possibility of being requested after the first data set is requested by the client, in accordance with the reference relationship information and a step of prefetching the second data sets from one or more second servers having a possibility of possessing the second data sets.

20. A distributed data management method according to claim 19, wherein said prefetching step includes a step of selecting one or more second servers from one or more third servers associated with the first server, by using the communications history.

21. A distributed data management method used by a process as a client using one or more sets of data and by two or more processes as servers, in a computer system having two or more computers each executing one or more processes and interconnected by a network, the method comprising the steps of:
(1) receiving by a first server a transmission request of a first data set from a second server;
(2) selecting one or more second servers expected to store a second data set having a possibility of being requested after the first data set; and
(3) requesting the selected one or more second servers to transmit the second data set to hierarchically prefetch the second data set from the first server to one or more second servers, and
wherein said selecting step (2) comprises a step of:
selecting one or more third servers associated with the first server from one or more second servers by using past communications history between the first server and the second servers.

22. A distributed data management method used by a process as a client using one or more sets of data and by two or more processes as servers, in a computer system having two or more computers each executing one or more processes and interconnected by a network, the method comprising the steps of:
(1) predicting a time taken to acquire from the second server two or more data sets processed by the first server;
(2) scheduling an order of discarding two or more data sets by using the predicted time, and
wherein said predicting step (1) is executed by using past communications history between servers.

23. A distributed data management method according to claim 22, wherein said scheduling step (2) is executed by using the predicted time and the number of times the data set requested by the client in a predetermined past time period.

24. A computer program product comprising:
a computer useable medium having computer readable program code means embodied therein for performing distributed data management by a process as a client using one or more sets of data and by two or more processes as servers providing data designated by a request from the client, in a computer system having two or more computers each executing one or more processes and interconnected by a network, the computer readable program code means in the computer program product comprising:
computer readable program code means for storing past communications history between first and second servers in a memory;
computer readable program code means for selecting one or more third servers from second servers by using the communications history, in accordance with a possibility that one or more second servers store necessary data for the first server; and
computer readable program code means for transmitting the necessary data from the first server to the third servers.

25. A distributed data management system comprising:
a network for interconnecting a computer as a client for using one or more data set and two or more computers as servers possessing one or more data sets for providing data designated by the client;
storage means for storing past communications history between a first server and one or more second servers;
means for selecting at least one second server having a possibility of possessing necessary data for the first server, in accordance with the past communications history; and
means for requesting the selected second server to transmit the necessary data.

26. A computer readable program product comprising:
a computer useable medium having a computer program embodied therein for performing distributed data management by two or more processes as servers in a computer system having two or more computers each executing one or more processes and interconnected by a network, said computer program comprising:
Computer program code means for requesting by a first server, two or more second servers to transmit necessary data to said first server in accordance with a possibility of a presence of the necessary data in said two or more second servers,
wherein said computer program code means comprises:
first computer program code means for selecting by said first server selecting one or more third servers from two or more second servers,
second computer program code means for requesting the selected third server to transmit the necessary data, and
third computer program code means for requesting the second server other than the third server to hold a transmission of the necessary data, and
wherein said first computer program code means comprises:
computer program code means for storing by the first server past communications history between the first server and the second servers in a memory, and
computer program code means for selecting the third server from the second servers by using the past communications history.

27. A computer readable program product comprising:
a computer useable medium having computer readable program code means embodied therein for performing distributed data management by a process as a client using one or more sets of data and by two or more processes as servers in a computer system having two or more computers each executing one or more processes and interconnected by a network, the computer readable program code means in the computer readable program product comprising:
computer readable program code means for storing by a first server in a memory, past communications history with time during a first time at a second time interval between the first server and two or more second servers;
computer readable program code means for predicting by the first server a time when prefetch data can be acquired at high speed from one or more second servers having a possibility of possessing the prefetch data, by using the communications history with time, in order to request servers other than the first server to acquire the prefetch data before a request from the client, the prefetch data being expected to have a high possibility to be requested by the client in a future; and
computer readable program code means for requesting by the first server at the predicted time the third server selected from at least some of the second servers to transmit the prefetch data.

28. A computer readable program product comprising:
a computer useable medium having computer readable program code means embodied therein for performing distributed data management by two or more processes as servers in a computer system having two or more computers each executing one or more processes and interconnected by a network, the computer readable program code means in the computer readable program product comprising:
computer readable program code means for storing by a first server past communications history between the first server and second servers in a memory;
computer readable program code means for selecting one or more third servers from second servers associated with the first server, by using the communications history; and
computer readable program code means for transmitting from the first server to the second server at least part of a list of data possessed by the first server.

29. A computer readable program product comprising:
a computer useable medium having computer readable program code means embodied therein for performing distributed data management by a process as a client using one or more sets of data and by two or more processes as servers, in a computer system having two or more computers each executing one or more processes and interconnected by a network, the computer readable program code means in the computer readable program product comprising:
computer readable program code means for storing at least one of past communications history between a first server and second servers and request history from the client to the first server in a memory,
computer readable program code means for determining by the first server one or more second data sets having a higher frequency of a request following a request for a first data set in accordance with the request history;
computer readable program code means for storing by the first server, as reference relationship information, data representative of a combination of a name of the first data set and names of second data sets; and
computer readable program code means for exchanging the reference relationship information of the first server with reference relationship information of one or more second servers.

* * * * *